(12) United States Patent
Iwasaki (10) Patent No.: US 7,876,508 B2
(45) Date of Patent: Jan. 25, 2011

(54) LENS DRIVE UNIT, LENS BARREL, AND IMAGE FORMING DEVICE

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/541,761

(22) Filed: Aug. 14, 2009

(65) Prior Publication Data
US 2010/0046098 A1    Feb. 25, 2010

(30) Foreign Application Priority Data
Aug. 21, 2008    (JP) ............................. 2008-213160

(51) Int. Cl.
G02B 15/14    (2006.01)
(52) U.S. Cl. ...................................... 359/694; 359/817
(58) Field of Classification Search .................. 359/694, 359/817
See application file for complete search history.

(56) References Cited

U.S. PATENT DOCUMENTS

| 6,853,499 | B2 | 2/2005 | Iwasaki | |
|---|---|---|---|---|
| 2008/0007847 | A1* | 1/2008 | Koyama | ...................... 359/817 |
| 2009/0046156 | A1 | 2/2009 | Iwasaki | |
| 2009/0046198 | A1 | 2/2009 | Iwasaki | |
| 2009/0066829 | A1 | 3/2009 | Iwasaki | |

FOREIGN PATENT DOCUMENTS

| JP | 2000-147358 A | 5/2000 |
|---|---|---|
| JP | 2000-147358 A | 5/2000 |
| JP | 2006-039153 A | 2/2006 |
| JP | 2006-039153 A | 2/2006 |

* cited by examiner

*Primary Examiner*—Jordan M. Schwartz
*Assistant Examiner*—James C Jones
(74) *Attorney, Agent, or Firm*—Dickstein Shapiro LLP (57) ABSTRACT

A lens drive unit is configured to move a lens holding frame to a desired position by the engagement between a cam groove of a rotary cylinder and a cam follower of the lens holding frame. The lens drive unit includes a second linearly-moving guide cylinder arranged between the lens holding frame and a first linearly-moving guide cylinder. The second linearly-moving guide cylinder can be moved in the optical a direction with rotation of the rotary cylinder by the engagement of a cam follower of the second linearly-moving guide cylinder with a second cam groove of the rotary cylinder. The lens holding frame is guided in the optical axis direction by the second linearly-moving guide cylinder and moved in the optical axis direction with rotation of the rotary cylinder by the engagement of a cam follower of the lens holding frame with a first cam groove of the rotary cylinder.

10 Claims, 5 Drawing Sheets

LENS DRIVE UNIT, LENS BARREL, AND IMAGE FORMING DEVICE

CROSS REFERENCE TO THE RELATED APPLICATION

This application is based on and claims the priority benefit of Japanese Patent Application No. 2008-213160, filed on Aug. 21, 2008, the disclosure of which is incorporated herein by reference in its entirety.

BACKGROUND OF THE INVENTION

1. Field of the Invention

The present invention relates to a lens drive unit, a lens barrel, and an image forming device, and more particularly relates to a lens drive unit capable of storing lens groups when not in use and of extending the lens groups by a larger amount when positioning the lens groups for use, a lens barrel that uses this lens drive unit, and an image forming device such as a camera that uses this lens barrel.

2. Description of the Related Art

A lens barrel that is incorporated into an image forming device such as a digital camera includes an imaging device, multiple lenses for forming an image on the imaging device, and a lens drive unit for moving the lenses to a predetermined position. Many of recent lens barrels used for compact cameras are each constituted by two rotary cylinders that rotate and move forward and backward in an optical axis direction, one or two linearly-moving guide barrels that move forward and backward in the optical axis direction without rotating, and one or more lens holding barrels that hold lenses and move forward and backward in the optical axis direction without rotating.

Lens barrels have been widely used which are stored compactly when not in use, and which, when in use, extend in the optical axis direction and hold each lens in a predetermined position to set a whole lens system at a predetermined focal distance. The miniaturization of lens barrels has been accelerated with the miniaturization of cameras. A multistage collapsible lens barrel with two or more rotary cylinders that meets the demand for miniaturization has been put into practical use. For example, a lens barrel described in Japanese Patent Application Publication No. 2006-039153 includes a front lens group and a first lens frame that holds this lens group. The first lens frame is movable forward and backward by being held by two rotary cylinders, two linearly-moving guide barrels, and one fixed cylinder.

A multistage collapsible lens barrel makes it possible to achieve miniaturization and to secure the moving distance of a lens. Thus, such a lens barrel is extremely suitable for a compact camera. Meanwhile, the demand for lenses with higher magnifications has been increased, and this increases the necessity of securing a larger lens extension amount. Although achieving the required lens extension amount, the multistage collapsible lens barrel may increase the area of a lens barrel, and thus may result in an increase in size of a camera. To avoid this, a multistage collapsible lens barrel needs to be designed to secure a larger extension amount while having a minimum possible size. In the multistage collapsible lens barrel, lenses can extend to the maximum extent toward an object when a rotary cylinder for moving the lenses to a desired position engages with or is fitted with other members that operate in association with this rotary cylinder by a minimum necessary amount. Even in this maximum extended state, a lens holding frame needs to be fitted with not only the rotary cylinder but also a linearly-moving guide barrel for moving the lenses straight. Since the linearly-moving guide barrel has functions of guiding the lens holding frame to move straight and of preventing inclination of the lens holding frame by being fitted with the lens holding frames, the linearly-moving guide barrel needs to engage with or be fitted with the lens holding frame by a sufficient amount. Thus, there has been a problem that the necessary fitting amount of the lens holding frame with the linearly-moving guide barrel reduces the actual movement amount of the lenses from the maximum lens extension amount actually achievable by the rotary cylinder, whereby the lenses can be moved only by a smaller lens extension amount.

Figure 4:
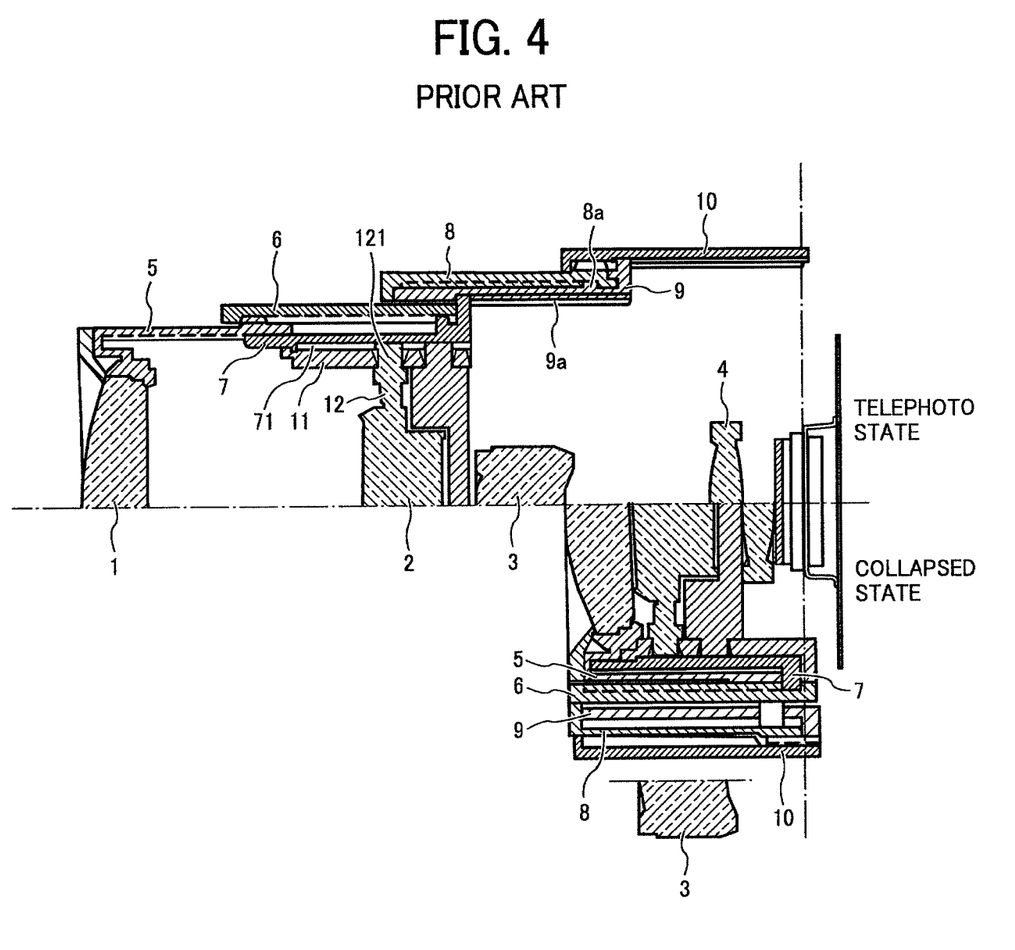
FIG. 4 is a longitudinal sectional view showing a configuration of a conventional lens drive unit in comparison between a telephoto state and a stored state.
Figure 5:
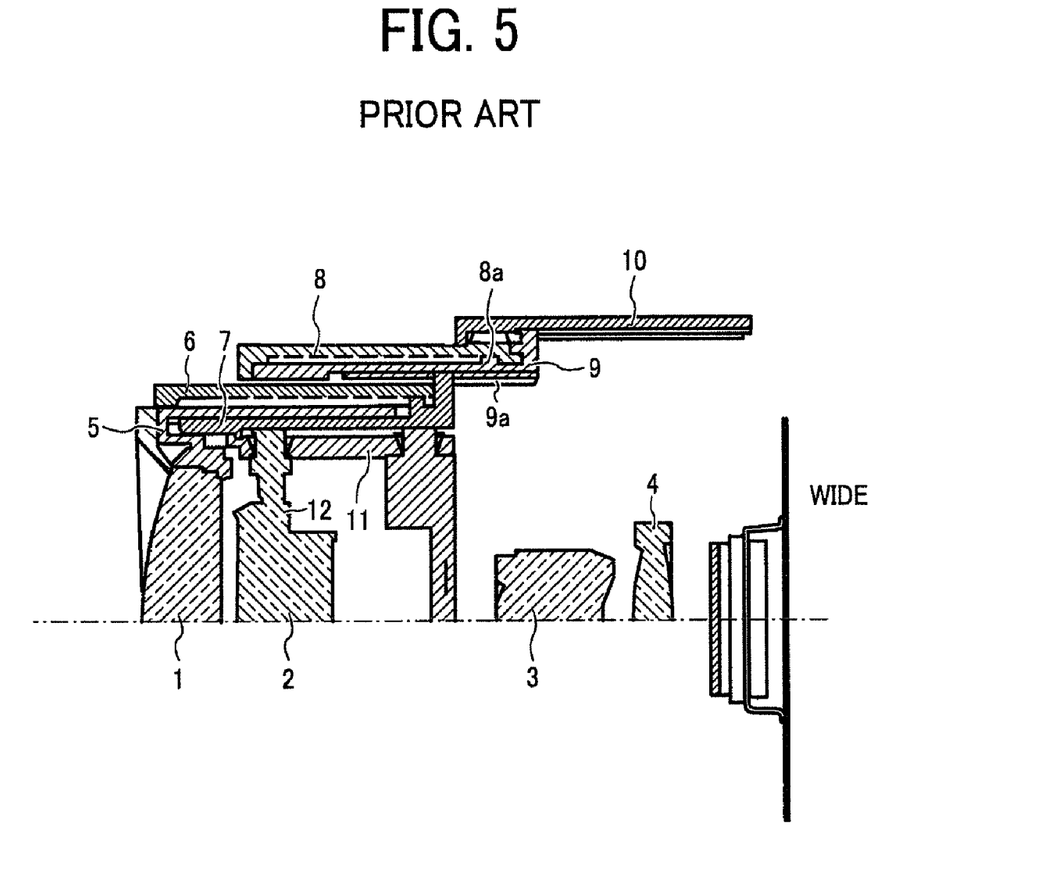
FIG. 5 is a longitudinal sectional view showing a wide-angle state of the conventional lens drive unit.

In order to explain more detail, FIGS. 4 and 5 show a configuration of a lens barrel having the same configuration of a lens barrel disclosed in Japanese Patent Application Publication No. 2006-039153.

In FIGS. 4 and 5, a first lens group 1 is held by a first lens holding frame 5, this lens holding frame 5 is held by a rotary cylinder 6 and a first linearly-moving guide cylinder 7, and the rotary cylinder 6 fits into a helicoid formed in an internal diameter part of a linearly-moving guide member 9. The first linearly-moving guide cylinder 7 is held so as to allow rotation of the rotary cylinder 6 and to be guided by the linearly-moving guide member 9 to move straight in an optical axis direction while integrally holding the rotary cylinder 6. A rotary member 8 fits into a helicoid formed in an internal diameter part of a fixed cylinder 10. The linearly-moving guide member 9 is held so as to be rotatable relative to the rotary member 8 and to be guided by the fixed cylinder 10 to move straight integrally with the rotary member 8 in the optical axis direction. A rotary key groove 8a is provided in a surface perpendicular to the optical axis direction in the internal diameter part of the rotary member 8. A rotary key 9b provided in the outer circumference of the linearly-moving guide member 9 fits into the rotary key groove 8a. In this way, the rotary member 8 and the linearly-moving guide member 9 can integrally move in the optical axis direction while rotating relative to each other.

The rotary member 8 and the rotary cylinder 6 are connected by a rotation driving pin transmitting a rotational force of the rotary member 8, and can move forward and backward in the optical axis direction when the rotary member 8 rotates because of the helicoid connection. Furthermore, the first lens holding frame 5 has a lens driving pin, and this lens driving pin engages with a cam groove provided in an internal diameter part of the rotary cylinder 6 and engages with a guide groove of the first linearly-moving guide cylinder 7 provided in the optical axis direction. Thereby, a lens can move to a position corresponding to the shape of the cam groove.

The upper half of FIG. 4 shows a telephoto state where the focal distance of a lens becomes the maximum, and the lower half thereof shows a stored state where the lens barrel is retracted to have the minimum lens interval when no photograph is taken. FIG. 5 shows a wide-angle state where the focal distance becomes the minimum. In FIGS. 4 and 5, a rotary cam cylinder 11 is fitted with the inside of the first linearly-moving guide cylinder 7. The rotary cam cylinder 11 is held to be movable integrally with the first linearly-moving guide cylinder 7 in the optical axis direction, and is connected to the rotary cylinder 6 and thus is rotatable integrally with the rotary cylinder 6. The rotary cam cylinder 11 includes a cam groove, through which a second cam follower 121 provided in a second lens holding frame 12 for holding a second lens group 2 passes. This cam follower 121 passes through the cam groove of the rotary cam cylinder 11, and engages with a linearly-moving groove 71 in the first linearly-moving guide cylinder 7. With rotation of the rotary cam cylinder 11, the intersecting position of the cam groove of the rotary cam cylinder 11 and the linearly-moving groove 71 of the first linearly-moving guide cylinder 7 moves in the optical axis direction. Thereby, the second cam follower 121 fitted into this intersecting position and the second lens holding frame 12 integral therewith move straight in the optical axis direction.

In a mode shown in FIG. 4, the first lens group 1 moves to the maximum extended position toward the object with rotation of the rotary member 8, and extends an interval between the first lens group 1 and the second lens group 2 to achieve a long focal distance. In this state, the fitting amount of the first lens holding frame 5 with the first linearly-moving guide cylinder 7 is extremely small, which causes a problem that the first lens holding frame 5 is likely to incline. Furthermore, the first linearly-moving guide cylinder 7 may be short with a configuration in which a barrier mechanism that protects a lens when no photograph is taken is provided forward of the first lens group 1 and is located in the same position as that of other rotary cylinders in the stored state. Accordingly, there is a problem that the first lens holding frame 5 cannot move forward of a front end of the rotary cylinder 6 since otherwise the first lens holding frame 5 separates from the first linearly-moving guide cylinder 7.

SUMMARY OF THE INVENTION

An object of the present invention is to provide a lens drive unit, a lens barrel, and a camera that can increase the extension amount of a lens group without increasing the thickness when being stored, and that can secure the stability against inclination of the lens group even in a state where the lens group extends to the maximum extended position.

To accomplish the above object, a lens drive unit according to one embodiment of the present invention includes a plurality of lens groups, at least one lens holding frame that holds at least one of the plurality of lens groups, a rotary cylinder that is connected with the lens holding frame by a first cam mechanism and configured to allow the lens holding frame to move in an optical axis direction, a fixed cylinder configured to hold the plurality of lens groups, the lens holding frame, and the rotary cylinder, a first linearly-moving guide cylinder that is rotatable relative to the rotary cylinder, and is movable integrally with the rotary cylinder in the optical axis direction, and a second linearly-moving guide cylinder that is arranged between the lens holding frame and the first linearly-moving guide cylinder and is connected to the rotary cylinder by a second cam mechanism provided between the rotary cylinder and the second linearly-moving guide cylinder.

The second linearly-moving guide cylinder is moved in the optical axis direction by the second cam mechanism when the rotary cylinder is rotated.

The lens holding frame is guided in the optical axis direction by the second linearly-moving guide cylinder and is moved in the optical axis direction by the first cam mechanism, when the rotary cylinder is rotated.

DETAILED DESCRIPTION OF THE PREFERRED EMBODIMENTS

An embodiment in which a lens drive unit according to the present invention is applied to an image forming device, for example, a camera, is described below in detail with reference to the accompanying drawings.

In this embodiment, the same components as those in the conventional lens drive unit shown in FIGS. 4 and 5 are donated by the same reference numerals. Furthermore, in FIGS. 1 and 2, in order to more clearly indicate the configuration of the lens drive unit according to the present invention as compared with the configuration of the conventional lens drive unit, the configuration of the lens drive unit according to the present invention is shown in the lower half, and the configuration of the conventional lens drive unit is shown in the upper half.

Figure 1:
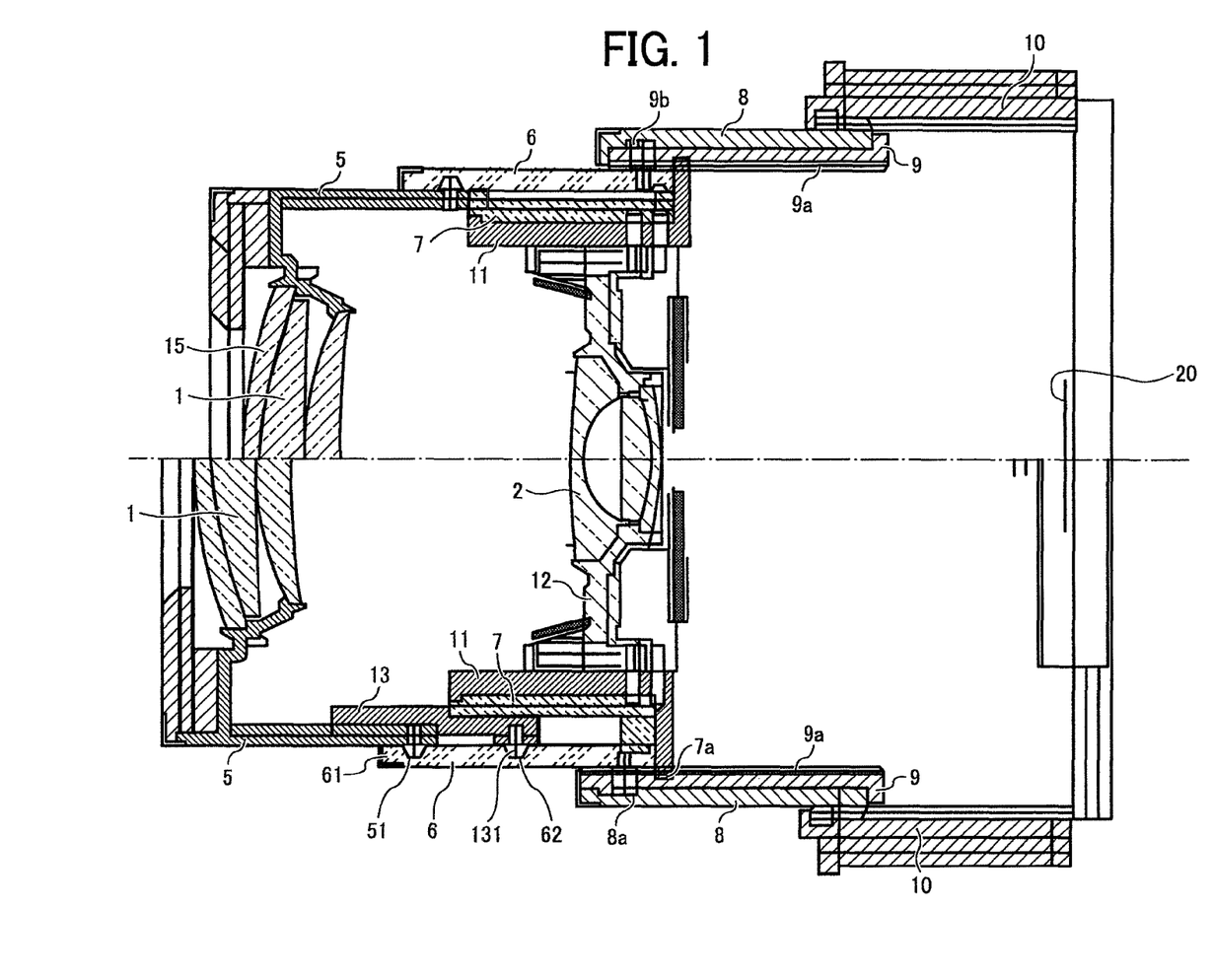
FIG. 1 is a longitudinal sectional view showing a lens dive unit in a maximum lens extended state according to an embodiment of the present invention in comparison with that of a conventional example.
Figure 2:
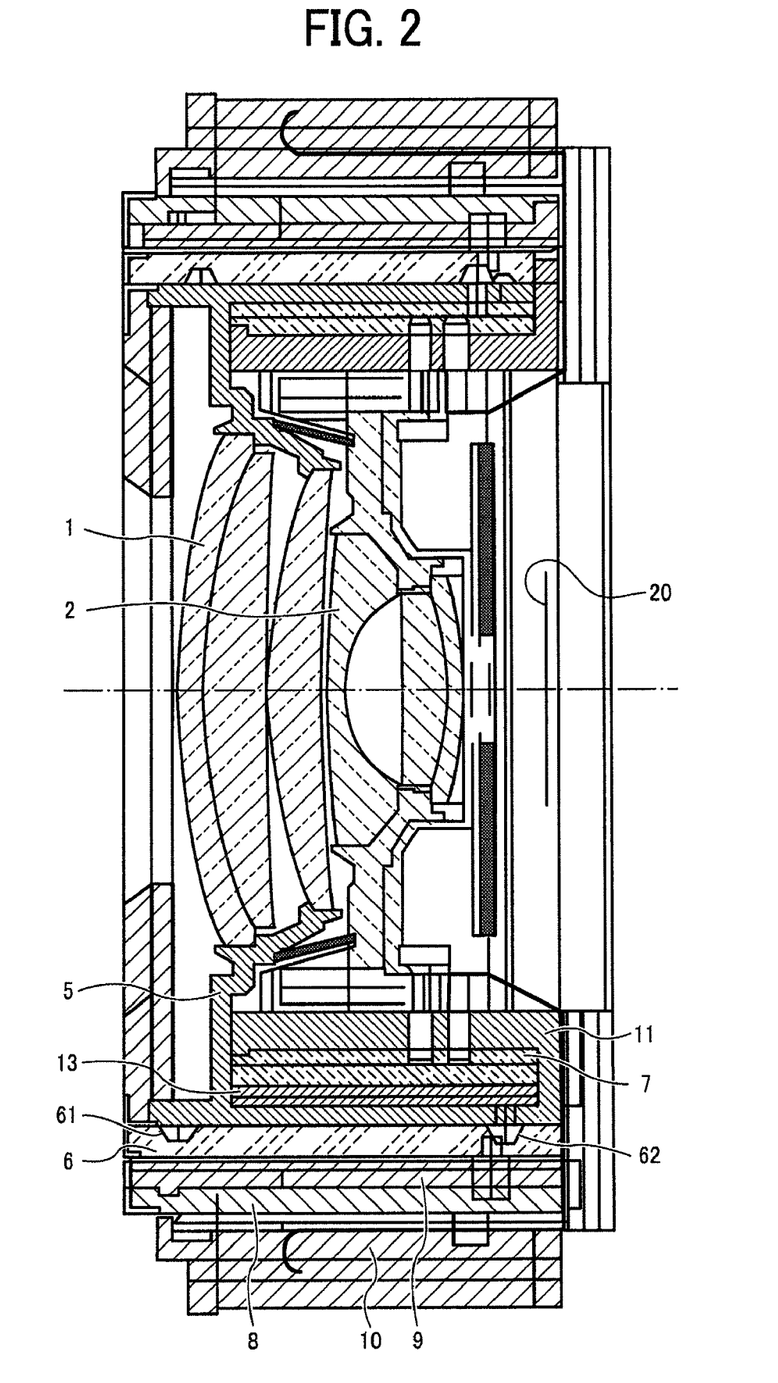
FIG. 2 is a longitudinal sectional view showing the lens drive unit in a stored state of the embodiment in comparison with that of the conventional example.

FIG. 1 illustrates a state where multiple lens groups are extended, and especially shows a state where the multiple lens groups are extended to a telephoto end so that photographs can be taken while a first lens group 1 being extended to a maximum position. FIG. 2 illustrates a state where the multiple lens groups are collapsed.

As shown in FIGS. 1 and 2, the lens drive unit according to the present invention includes a rotary cylinder 6, a first linearly-moving guide cylinder 7, and a second linearly-moving guide cylinder 13 provided between the rotary cylinder 6 and the first linearly-moving guide cylinder 7. For example, the first lens group 1 composed of three lenses is held by a first lens holding frame 5. The first lens group 1, together with a second lens group 2 and other lens groups which are not shown, make it possible to shoot an object (not shown) by imaging light from the object on an imaging surface of an imaging device 20. The lens holding frame 5 is held between the second linearly-moving guide cylinder 13 and the rotary cylinder 6. The second linearly-moving guide cylinder 13 has substantially the same length in the optical axis direction as those of the first linearly-moving guide cylinder 7 and a rotary cam cylinder 11, and is connected to the rotary cylinder 6 via a second cam mechanism. This second cam mechanism in this embodiment includes a second cam groove 62 formed in the inner circumferential surface of the rotary cylinder 6, and a cam follower 131 provided on the outer circumference of the second linearly-moving guide cylinder 13 so as to fitted into this second cam groove 62 (see, FIG. 1).

The rotary cylinder 6 and the lens holding frame 5 are connected to each other via a first cam mechanism. This first cam mechanism includes a first cam groove 61 provided in the rotary cylinder 6, and a cam follower 51 provided on the lens holding frame 5 so as to fitted into this first cam groove 61 (see, FIG. 1). With the above structure, the second linearly-moving guide cylinder 13 is moved in the optical axis direction by the second cam mechanism when the rotary cylinder 6 is rotated, and the lens holding frame 5 is guided in the optical axis direction by the second linearly-moving guide cylinder 13 and is moved in the optical axis direction by the first cam mechanism, when the rotary cylinder 6 is rotated.

Figure 3:
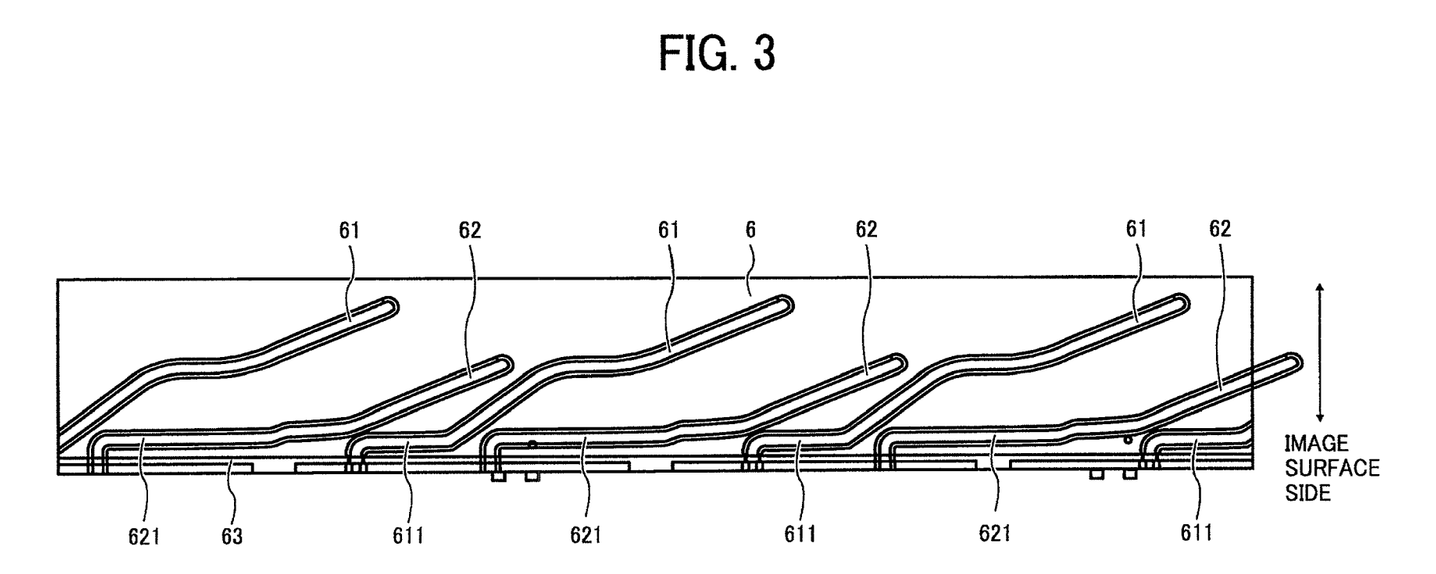
FIG. 3 is a development view of a rotary cylinder in the embodiment.

FIG. 3 shows a state where the inner circumferential surface of the rotary cylinder 6 is developed. As shown in FIG. 3, the second cam grooves 62 and the first cam grooves 61 are formed in the inner circumferential surface of the rotary cylinder 6. The three first cam groove 61 and the three second cam groove 62 are alternately formed at regular intervals in the circumferential direction. As will be explained later, the first cam groove 61 is a cam groove moving the first lens group 1 in the optical axis direction at the time of zooming, and the second cam groove 62 is a cam groove moving the second linearly-moving guide cylinder 13 in the optical axis direction at the time of zooming.

In a mode where each lens group is in a collapsed position, end portions of the first and second cam grooves 61 and 62 on the image surface side are grooves in the circumferential direction that extend in parallel with a direction orthogonal to a rotation center line of the rotary cylinder 6, as shown with the reference numerals 611, 621. Thereby, neither the first lens group 1 nor the second linearly-moving guide cylinder 13 moves in the optical axis direction while the rotary cylinder 6 is rotating in a predetermined rotating range. These grooves 611, 621 in the circumferential direction are in the substantially same position in the optical axis direction, and are mutually shifted in the rotational direction. A key groove 63 in the circumferential direction is also formed adjacent to the end surface on the image surface side of the inner circumference of the rotary cylinder 6.

The second linearly-moving guide (cylinder 13 is arranged between the first lens holding frame 5 and the first linearly-moving guide cylinder 7. The second linearly-moving guide cylinder 13 includes guide grooves in the inner circumferential surface and the outer circumferential surface, and guide projections respectively provided in the first linearly-moving guide cylinder 7 and the first lens holding frame 5 are fitted into these guide grooves respectively. Thus, the second linearly-moving guide cylinder 13, the first lens holding frame 5, and the first linearly-moving guide cylinder 7 can be mutually moved straightly in the optical axis direction. As mentioned above, the cam follower 131 of the second linearly-moving guide cylinder 13 is fitted into the second cam groove 62 of the rotary cylinder 6. Accordingly, as described above, the rotation of the rotary cylinder 6 allows the second linearly-moving guide cylinder 13 to move forward and backward in the optical axis direction with respect to the rotary cylinder 6 while rotating with the rotary cylinder 6 in the rotational direction. Furthermore, when the first lens holding frame 5 rotates around an optical axis with the second linearly-moving guide cylinder 13, the first lens holding frame 5 and the first lens group 1 integral therewith move forward and backward in the optical axis direction by the cam follower 51 of the first lens holding frame 5 being guided by the first cam groove 61 of the rotary cylinder 6.

In the conventional lens drive unit shown in the upper half of FIG. 1, in the maximum extended position of the first lens group 1, the first lens holding frame 5 advances forward of the front end of the first linearly-moving guide cylinder 7, and the first lens holding frame 5 does not overlap the first linearly-moving guide cylinder 7 in the optical axis direction. However, as shown in the lower half of FIG. 1, this embodiment is configured in such a manner that the second linearly-moving guide cylinder 13 advances forward of the first linearly-moving guide cylinder 7 and an approximate anterior half portion of the second linearly-moving guide cylinder 13 overlaps the first lens holding frame 5. This configuration allows the first lens holding frame 5 to advance forward greatly while being linearly guided.

In this manner, the dimensions of the second linearly-moving guide cylinder 13, the first linearly-moving guide cylinder 7, and the first lens holding frame 5 are set to have a relation in which the second linearly-moving guide cylinder 13 is fitted with the first linearly-moving guide cylinder 7 and with the first lens holding frame 5 by almost the same amount when the first lens holding frame 5 advances to the maximum position. With this configuration, the second linearly-moving guide cylinder 13 can be fitted with the first linearly-moving guide cylinder 7 and with the first lens holding frame 5 by the larger amount. Thereby, the first lens holding frame 5 can be held so as not to be inclined even if being extended to the maximum level. Furthermore, by constituting each cam groove of the rotary cylinder 6 as mentioned above, a total of six cam followers 51, 131 can be moved to the almost same position in the optical axis direction when the lens groups are stored, and thus the second linearly-moving guide cylinder 13 can have a longer length in the optical axis direction. As a result, the first lens holding frame 5 can be stably held.

A camera with a collapsible lens barrel is provided with a barrier mechanism for protecting a lens when not in use, that is, when the lens barrel is stored in a main body of the camera. In FIG. 1, reference numeral 15 indicates this barrier mechanism part. This barrier mechanism part 15 includes a shutter-blade shaped member that opens and closes the front surface of the lens, and a mechanism that opens and loses this member. For this reason, the barrier mechanism part 15 has a certain weight, and has a longer dimension in the optical axis direction. Therefore, incorporation of the barrier mechanism part 15 into the front end of the first lens holding frame 5 makes the first lens holding frame 5 more likely to be inclined.

However, as mentioned above, according to the embodiment of the present invention, addition of the second linearly-moving guide cylinder 18 allows the first lens holding frame 5 not to be inclined even if the weight of the barrier mechanism part 15 is applied, and, if it should be inclined, allows the inclination to be suppressed to a minute level.

Furthermore, the rotary cylinder 6 fits into the helicoid formed in the internal diameter part of a linearly-moving guide member 9. The first linearly-moving guide cylinder 7 allows rotation of the rotary cylinder 6 by a linearly-moving key 7a thereof being guided by a linearly-moving key groove 9a of the linearly-moving guide member 9, and is held so as to move straight while integrally holding the rotary cylinder 6 in the optical axis direction. A rotary member 8 has a helicoid in the outer circumference of the rear end part (at the right end section in FIG. 1). This helicoid fits into a helicoid formed in the internal diameter part of a fixed cylinder 10. Thereby, the linearly-moving guide member 9 is allowed to rotate relative to the rotary member 8, and is held so as to move straight integrally with the rotary member 8 in the optical axis direction while being guided by the fixed cylinder 10. A rotary key groove 8a is provided in a surface perpendicular to the optical axis direction in the internal diameter part of the rotary member 8. A rotary key 9b provided on the outer circumference of the linearly-moving guide member 9 fits into the rotary key groove 8a so that the rotary member 8 and the linearly-moving guide member 9 can integrally move in the optical axis direction while rotating relative to each other.

The rotary member 8 and the rotary cylinder 6 are connected by a rotation driving pin transmitting a rotational force of the rotary member 8 to the rotary cylinder 6, and can be moved forward and backward in the optical axis direction by the helicoid connection when the rotary member 8 rotates. The rotary cam cylinder 11 is fitted with the inside of the first linearly-moving guide cylinder 7. Thereby, the rotary cam cylinder 11 is held to be movable in the optical axis direction integrally with the first linearly-moving guide cylinder 7, and is connected with the rotary cylinder 6 to be rotatable integrally with the rotary cylinder 6. The rotary cam cylinder 11 includes a cam groove, and this cam groove is penetrated by a cam follower provided in a second lens holding frame 12 that holds the second lens group 2. This cam follower is configured to be penetrated through the cam groove of the rotary cam cylinder 11, and engaged with a linearly-moving groove in the first linearly-moving guide cylinder 7. With rotation of the rotary cam cylinder 11, the intersecting position of the cam groove of the rotary cam cylinder 11 and the linearly-moving groove of the first linearly-moving guide cylinder 7 is moved in the optical axis direction. In this manner, the cam follower fitted into this intersecting position and the second lens holding frame 12 integral therewith are moved straightly in the optical axis direction.

A basic configuration of the conventional lens barrel is as follows. The first lens group 1 is held by the first lens holding frame 6. The first lens holding frame 5 is held by a lens driving pin of the first lens holding frame 5 that engages with a cam groove provided in the internal diameter part of the rotary cylinder 6. A key is fitted into a linearly-moving groove on the internal diameter side of the first lens holding frame 5 so that the first linearly-moving guide cylinder 7 can move straight relatively. A key part of the first linearly-moving guide cylinder 7 engages with a key groove of the rotary cylinder 6 on a plane perpendicular to the optical axis direction so that the first linear-moving guide cylinder 7 can be rotated relative to the rotary cylinder 6 and can be moved integrally with the rotary cylinder 6 in the optical axis direction. Accordingly, the first lens holding frame 5 can be moved along the cam groove provided on the internal diameter side of the rotary cylinder 6 with rotation of the rotary cylinder 6. The rotary cylinder 6 is configured to be fitted into a helicoid provided on the internal diameter side of the first linearly-moving guide cylinder 7. The linearly-moving key 7a in the first linearly-moving guide cylinder 7 and a linearly-moving guide groove provided on the internal diameter side of the linearly-moving guide member 9 fit with each other so that the first linearly-moving guide cylinder 7 can be moved straightly in the optical axis direction with the linearly-moving guide member 9. The rotary member 8 engages with the rotary cylinder 6 by an engaging pin so as to rotate integrally with the rotary cylinder 6. As for the relation between the rotary member 8 and the linearly-moving guide member 9, the first rotary key groove 8a of the rotary member 8 and the first key 9b of the linearly-moving guide member 9 engage with each other on a plane perpendicular to the optical axis direction so that the rotary member 8 and the linearly-moving guide member 9 can integrally move in the optical axis direction and can relatively rotate around an optical axis. The rotation of the rotary member 8 allows the rotary cylinder 6 to move forward and backward while rotating along the helicoid provided in the internal diameter part of the linearly-moving guide member 9, and allows the first linearly-moving guide cylinder 7 to move straight in the optical axis direction without integrally rotating with the rotary cylinder 6.

The rotary member 8 is fitted into the fixed cylinder 10 holding the imaging device 20 composed of a CCD, for example, with a helicoid on the internal diameter side thereof, and the linearly-moving guide member 9 engages with the linearly-moving guide groove provided on the internal diameter side of the fixed cylinder 10 in the optical axis direction. A motor and multiple gears that drive the rotary member 8 are provided in the fixed cylinder 10. The rotational force received from the motor (not shown) rotates the rotary member 8 via the gear, and this allows the first lens holding frame 5 to move forward and backward in the optical axis direction via the rotary cylinder 6 and the first linearly-moving guide cylinder 7. The barrier mechanism part 15 is arranged forward of the first linearly-moving guide cylinder 7. This provides the first linearly-moving guide cylinder 7 having a shorter length than that of the rotary cylinder 6. At this time, in a telephoto state where the first lens holding frame 5 has extended to the maximum extent, the first lens holding frame 5 engages with or is fitted with the first linearly-moving guide cylinder 7 that guides this first lens holding frame 5 to move straight by the extremely small amount. Accordingly, the first lens holding frame 5 cannot extend further forward since otherwise the engagement therebetween might be separated. Furthermore, the first lens holding frame 5 is likely to incline due to the extremely small engagement amount.

In the embodiment of the present invention, the second linearly-moving guide cylinder 13 that can move straight while guiding the first lens holding frame 5 and the first linearly-moving guide cylinder 7 is provided between the first lens holding frame 5 and the first linearly-moving guide cylinder 7, and the second cam groove 62 that engages with the cam follower 131 of the second linearly-moving guide cylinder 13 is provided on the internal diameter side of the rotary cylinder 6. Thereby, the extension amount of the first lens holding frame 5 can be increased without increasing the thickness in the radial direction of the lens barrel, and the first lens holding frame 5 can be held without being inclined. Furthermore, since the second lens group 2 can be arranged in the same position as the position of the second lens group 2 in the conventional example, the interval between the first lens group 1 and the second lens group 2 can be further extended. This allows the magnification to be higher than that of the conventional configuration.

FIG. 2 illustrates a non-photographing state in which each lens group is stored, for example, in the camera body. The upper half shows the conventional structure and the lower half shows the embodiment of the present invention. As shown in FIG. 2, in the embodiment of the present invention in which the second linearly-moving guide cylinder 13 is added, the dimension of the unit in the optical axis direction in a state where all the lens groups are retracted is the same as that of the conventional example, and thus there is no problem of an increase in size.

With the lens drive unit according to the present invention, the lens holding frame is configured to fit into the second linearly-moving guide cylinder when moving to the most front end. This increases the extension amount of the lens holding frame. Furthermore, even when the extension amount of the lens group is increased, the lens holding frame is supported by the second linearly-moving guide cylinder in a state where the lens holding frame has moved to the most front end. Thus, inclination of the lens holding frame by gravity can be prevented or suppressed.

Effects of preventing or suppressing the inclination of the lens holding frame can be more increased by arranging the second linearly-moving guide cylinder between the lens holding frame and the first linearly-moving guide cylinder.

In a state where the lens holding frame has extended to the maximum extent toward the object in the optical axis direction, an area exists in which the lens holding frame does not overlap the first linearly-moving guide cylinder on a plane perpendicular to the optical axis direction in inside and outside directions. With the configuration in which the second linearly-moving guide cylinder is located in a position compensating for the area, even if the lens holding frame is extended greatly to such an extent that the lens holding frame and the first linearly-moving guide cylinder do not overlap with each other, the second linearly-moving guide cylinder can control the inclination of the lens holding frame.

In the state where the lens holding frame has extended to the maximum extent toward the object in the optical awns direction, with the configuration in which the second linearly-moving guide cylinder is fitted with the lens holding frame by substantially the same amount as that with the first linearly-moving guide cylinder, the lens holding frame can be stably held.

Each of the lens holding frame and the second linearly-moving guide cylinder has a cam follower, and the rotary cylinder has a cam groove with which the cam follower of the lens holding frame engages and a cam groove with which the cam follower of the second linearly-moving guide cylinder engages, individually. Accordingly, the second linearly-moving guide cylinder can have a long length without increasing the thickness of the lens barrel when the lens groups are retracted. As a result, the lens holding frame can be stably held.

In a state where the lens holding frame is retracted to the imaging surface side, the cam grooves of the rotary cylinder are formed so that the cam follower of the lens holding frame and the cam follower of the second linearly-moving guide cylinder can be located in almost the same position in the optical axis direction. Accordingly, the thickness of the lens barrel can be made thinner when no photograph is taken, while the extension amount of the first lens holding frame can be increased when a photograph is taken.

The lens barrel according to the present invention by applying the lens drive unit according to the present invention, and the image forming device according to the present invention, for example, a camera, by applying the lens barrel according to the present invention, become small when being stored, while the extension amount of the lens holding frame can be increased when a photograph is taken.

Although the preferred embodiments of the present invention have been described, it should be understood that the present invention is not limited to these embodiments, various modifications and changes can be made to the embodiments.

What is claimed is:

1. A lens drive unit comprising:
a plurality of lens groups;
at least one lens holding frame that holds at least one of the plurality of lens groups;
a rotary cylinder that is connected with the lens holding frame by a first cam mechanism and configured to allow the lens holding frame to move in an optical axis direction;
a fixed cylinder configured to hold the plurality of lens groups, the lens holding frame, and the rotary cylinder;
a first linearly-moving guide cylinder that is rotatable relative to the rotary cylinder, and is movable integrally with the rotary cylinder in the optical axis direction; and
a second linearly-moving guide cylinder that is arranged between the lens holding frame and the first linearly-moving guide cylinder and is connected to the rotary cylinder by a second cam mechanism provided between the rotary cylinder and the second linearly-moving guide cylinder,
wherein the first linearly-moving guide is disposed inside the second linearly-moving guide cylinder in a radial direction of the second linearly-moving guide cylinder,
wherein the lens holding frame is disposed outside the second linearly-moving guide cylinder in the radial direction of the second linearly-moving guide cylinder,
wherein the second linearly-moving guide cylinder is moved in the optical axis direction by the second cam mechanism when the rotary cylinder is rotated, and
wherein the lens holding frame is guided in the optical axis direction by the second linearly-moving guide cylinder and is moved in the optical axis direction by the first cam mechanism, when the rotary cylinder is rotated.

2. The lens drive unit according to claim 1, wherein
the first cam mechanism includes a first cam groove provided in the rotary cylinder and a cam follower provided in the lens holding frame to fit into the first cam groove, and
the second cam mechanism includes a second cam groove provided in the rotary cylinder and a cam follower provided in the second linearly-moving guide cylinder to engage with the second cam groove.

3. The lens drive unit according to claim 1, wherein
the second linearly-moving guide cylinder is arranged between the lens holding frame and the first linearly-moving guide cylinder, and is fitted with the first linearly-moving guide cylinder so as to be movable linearly in the optical axis direction.

4. The lens drive unit according to claim 1, wherein
in a state where the lens holding frame extends to the maximum extent toward an object in the optical axis direction, the lens holding frame and the first linearly-moving guide cylinder do not overlap each other at an area on a plane perpendicular to the optical axis direction, and the second linearly-moving guide cylinder is located in such a position as to bridge the area.

5. The lens drive unit according to claim 1, wherein
in a state where the lens holding frame extends to the maximum extent toward an object in the optical axis direction, the lens holding frame and the first linearly-moving guide cylinder do not overlap each other in the optical axis direction and the second linearly-moving guide cylinder is located in such a position as to bridge the area. where the lens holding frame and the first linearly-moving guide cylinder do not overlap in the optical axis direction.

6. The lens drive unit according to claim 4, wherein
in the state where the lens holding frame extends to the maximum extent toward the object in the optical axis direction, the second linearly-moving guide cylinder is fitted with the first lens holding frame and with the first linearly-moving guide cylinder by substantially the same amount.

7. The lens drive unit according to claim 6, wherein
the rotary cylinder includes cam grooves, and
the cam grooves of the rotary cylinder are formed so that a cam follower in the lens holding frame and a cam follower in the second linearly-moving guide cylinder are located in almost the same position in the optical axis direction in a state where the lens holding frame is retracted to an imaging surface side.

8. A lens barrel comprising:
a plurality of lens groups; and
the lens drive unit according to claim 1 that moves the lens groups, wherein
the lens groups are configured to be stored with a small interval between the lens groups when no photograph is taken, and to move to a predetermined position when a photograph is taken.

9. An image forming device comprising the lens barrel according to claim 8 that allows the lens groups to be stored with a small interval between the lens groups when no photograph is taken, and to move to a predetermined position when a photograph is taken.

10. A camera comprising the lens barrel according to claim 8 that allows the lens groups to be stored with a small interval between the lens groups when no photograph is taken, and to move to a predetermined position when a photograph is taken.

* * * * *